United States Patent [19]
Colombet et al.

[11] Patent Number: 5,922,796
[45] Date of Patent: *Jul. 13, 1999

[54] WATER-REDISPERSIBLE PULVERULENT COMPOSITION OF FILM-FORMING POLYMERS PREPARED FROM ETHYLENICALLY UNSATURATED MONOMERS

[75] Inventors: Jean-Francois Colombet, Rueil Malmaison; Gilles Guerin, Eaubonne; Mikel Morvan, Courbevoie, all of France

[73] Assignee: Rhone-Poulenc Chimie, Courbevoie, France

[*] Notice: This patent issued on a continued prosecution application filed under 37 CFR 1.53(d), and is subject to the twenty year patent term provisions of 35 U.S.C. 154(a)(2).

[21] Appl. No.: 08/735,349

[22] Filed: Oct. 22, 1996

[30] Foreign Application Priority Data

Oct. 25, 1995 [FR] France ................................. 95 12589

[51] Int. Cl.⁶ ....................................................... C08K 5/09
[52] U.S. Cl. ........................... 524/300; 524/321; 524/366; 524/376; 524/377; 524/378
[58] Field of Search ...................................... 524/366, 376, 524/377, 378, 300, 321

[56] References Cited

U.S. PATENT DOCUMENTS

| | | | |
|---|---|---|---|
| 4,971,649 | 11/1990 | Aydin | 156/327 |
| 5,252,128 | 10/1993 | Gopalkishnan | 106/724 |
| 5,258,428 | 11/1993 | Gopalkishnan | 524/5 |
| 5,262,452 | 11/1993 | Gopalkishnan | 523/130 |
| 5,300,542 | 4/1994 | Gopalkishnan | 524/8 |
| 5,348,993 | 9/1994 | Daeumer et al. | 524/44 |
| 5,401,786 | 3/1995 | Gopalkishnan | 524/5 |

*Primary Examiner*—Edward J. Cain
*Attorney, Agent, or Firm*—Andrew M. Solomon

[57] ABSTRACT

The present invention relates to water-redispersible pulverulent composition comprising:
- a powder of at least one water-insoluble film-forming polymer prepared from at least one ethylenically unsaturated monomer,
- at least one nonionic surfactant chosen from the polyoxyalkylenated derivatives,
- at least one water-soluble compound chosen from polyelectrolytes belonging to the family of weak polyacids.

27 Claims, No Drawings

WATER-REDISPERSIBLE PULVERULENT COMPOSITION OF FILM-FORMING POLYMERS PREPARED FROM ETHYLENICALLY UNSATURATED MONOMERS

The present invention relates to water-redispersible powders of film-forming polymers prepared from ethylenically unsaturated monomers, to a process for preparing them and to their use.

Redispersible powders obtained by spraying and drying dispersions of acrylic film-forming polymers, and especially dispersions of polymers of vinyl esters, are already known.

Film-forming polymers prepared from ethylenically unsaturated monomers are frequently used as adjuvants in inorganic hydraulic binding compositions to improve their use and their properties after hardening, such as adhesion to various substrates, leaktightness, flexibility and mechanical properties.

Redispersible powders have the advantage, compared to aqueous dispersions, that they can be premixed with cement in the form of ready-to-use pulverulent compositions which are usable, for example, for the manufacture of mortars and concretes intended for affixing to building materials, or for the manufacture of adhesive mortars or for the production of protective and decorative coatings for the inside or outside of buildings.

To achieve success in obtaining powders that do not agglomerate during storage through the effect of pressure and temperature and which are satisfactorily redispersible in water, it is customary to add relatively large amounts of inert substances and of protective colloids to them.

Thus, it has already been proposed to add to the dispersions, before spraying, melamine/formaldehyde/sulphonate (U.S. Pat. No. 3,784,648) or naphthalene/formaldehyde/sulphonate (DE-A-3143070) condensation products and/or vinylpyrrolidone/vinyl acetate copolymers (EP-078449).

French Patent FR-A-2,245,723 relates to a stable and water-dispersible preparation dried by freezing, containing a powder of a polymer latex and a water-soluble dispersing agent which is a saccharide.

The object of the present invention is to provide a new pulverulent composition which is completely or almost completely redispersible in water, based on a film-forming polymer prepared from ethylenically unsaturated monomers.

Another object of the present invention is to provide a redispersible powder of the above type which is stable on storage without agglomeration.

Another object of the present invention is to provide a process for preparing the powders of the above type from latices of film-forming polymer.

Another object of the present invention is to provide a redispersible powder of the above type which, in powder form or after redispersion, where appropriate, in water in the form of a pseudolatex, is usable in all the fields of application of latices to produce coatings (in particular paints, paper coating composition) or adhesive compositions (in particular pressure-sensitive adhesives, tile adhesives).

Another object of the present invention is to provide a redispersible powder of the above type (or the pseudolatex derived therefrom) for the purpose, more especially, of use as additives to hydraulic binders of the mortar or concrete type.

These and other objects are achieved by the present invention which relates, in effect, to a water-redispersible pulverulent composition comprising:

a powder of at least one water-insoluble film-forming polymer prepared from at least one ethylenically unsaturated monomer, at least one nonionic surfactant chosen from the polyoxyalkylenated derivatives, at least one water-soluble compound chosen from polyelectrolytes belonging to the family of weak polyacids.

The subject of the invention is, in addition, a process for preparing such compositions, consisting in:

removing the water from an aqueous emulsion consisting of the said water-insoluble film-forming polymer prepared by aqueous emulsion polymerization and containing at least one nonionic surfactant, at least one water-soluble compound and, where appropriate, at least one additional surfactant or one anti-caking agent, and spraying the dry residue to a powder of desired particle size.

The compositions according to the invention have the advantage of redispersing spontaneously in water, to give an emulsion again having a particle size close to that of the initial emulsion.

Other advantages and features of the invention will become more clearly apparent on reading the description and the examples which follow.

The invention relates, in the first place, to a water-redispersible pulverulent composition comprising:

a powder of at least one water-insoluble film-forming polymer prepared from at least one ethylenically unsaturated monomer, at least one nonionic surfactant chosen from the polyoxyalkylenated derivatives, at least one water-soluble compound chosen from polyelectrolytes belonging to the family of weak polyacids.

The water-insoluble film-forming polymers are prepared from ethylenically unsaturated monomers, in particular of the vinyl and/or acrylate type.

The water-insoluble film-forming polymers are preferably vinyl or acrylate homopolymers or vinyl acetate, styrene/butadiene, styrene/acrylate, acrylate and styrene/butadiene/acrylate copolymers.

The film-forming polymers preferably have a glass transition temperature of between approximately −20° C. and +50° C., preferably between 0° C. and 40° C. These polymers may be prepared in a manner known per se, by emulsion polymerization of ethylenically unsaturated monomers using polymerization initiators and in the presence of standard emulsifying and/or dispersing agents. The content of polymer in the emulsion generally lies between 30 and 70% by weight, and more specifically between 35 and 65% by weight.

As monomers, there may be mentioned vinyl esters, and more especially vinyl acetate; alkyl acrylates and methacrylates in which the alkyl group contains from 1 to 10 carbon atoms, for example methyl, ethyl, n-butyl and 2-ethylhexyl acrylates and methacrylates; and vinylaromatic monomers, especially styrene. These monomers may be copolymerized with one another or with other ethylenically unsaturated monomers.

As non-limiting examples of monomers which can be copolymerized with vinyl acetate and/or acrylic esters and/or styrene, there may be mentioned ethylene and olefins such as isobutene; the vinyl esters of saturated, branched or unbranched monocarboxylic acids having from 1 to 12 carbon atoms, such as vinyl propionate, "Versatate" (registered trade mark for the esters of branched $C_9$–$C_{11}$ acids), pivaloate and laurate; the esters of unsaturated monoor dicarboxylic acids possessing 3 to 6 carbon atoms with alkanols possessing 1 to 10 carbon atoms, such as methyl, ethyl, butyl and ethylhexyl maleates and fumarates; vinylaromatic monomers such as methylstyrenes and vinyltoluenes; vinyl halides such as vinyl chloride and vinylidene chloride, and diolefins, especially butadiene.

The emulsion polymerization of the monomers is carried out in the presence of an emulsifier and a polymerization initiator.

The monomers employed may be introduced as a mixture or separately and simultaneously into the reaction medium, either all at once before the beginning of the polymerization, or during the polymerization in successive fractions or in continuous fashion.

As emulsifying agent, the traditional anionic agents are generally employed, represented, in particular, by fatty acid salts, alkyl sulphates, alkylsulphonates, alkylaryl sulphates, alkylarylsulphonates, aryl sulphates, arylsulphonates, sulphosuccinates, alkyl phosphates of alkali metals and abietic acid salts, hydrogenated or otherwise. They are employed in the proportions 0.01 to 5% by weight relative to the total weight of the monomers.

The emulsion polymerization initiator, which is water-soluble, is represented more especially by hydroperoxides such as hydrogen peroxide, cumene hydroperoxide, diisopropylbenzene hydroperoxide and paramenthane hydroperoxide, and by persulphates such as sodium persulphate, potassium persulphate and ammonium persulphate. It is employed in amounts between 0.05 and 2% by weight relative to the total weight of the monomers. These initiators are optionally used in combination with a reducing agent such as sodium bisulphite or sodium formaldehydebisulphite, polyethylenamines, sugars, namely dextrose or sucrose, and metal salts. The amounts of reducing agent used vary from 0 to 3% by weight relative to the total weight of the monomers.

The reaction temperature, which is dependent on the initiator employed, is generally between 0 and 100° C., and preferably between 30 and 70° C.

It is possible to use a transfer agent in proportions ranging from 0 to 3% by weight relative to the monomer(s), generally chosen from mercaptans such as N-dodecyl mercaptan and tert-dodecyl mercaptan; cyclohexene; and halogenated hydrocarbons such as chloroform, bromoform and carbon tetrachloride. It enables the proportion of grafted polymer and the length of the grafted molecular chains to be adjusted. It is added to the reaction medium either before the polymerization or during polymerization.

According to a preferred embodiment of the invention, the film-forming polymer of the composition according to the invention has a surface which is only slightly carboxylated, and hence a low level of surface acidity.

Thus, it preferably has a level of surface acidity of not more than 100 microequivalents of —COOH functions per gram of polymer, preferably not more than 50 microequivalents of —COOH functions per gram of polymer.

The pulverulent compositions according to the invention comprise, in addition, at least one nonionic surfactant chosen from polyoxyalkylenated derivatives.

More especially, there may be mentioned:
ethoxylated or ethoxy/propoxylated fatty alcohols
ethoxylated or ethoxy/propoxylated triglycerides
ethoxylated or ethoxy/propoxylated fatty acids
ethoxylated or ethoxy/propoxylated sorbitan esters
ethoxylated or ethoxy/propoxylated fatty amines
ethoxylated or ethoxy/propoxylated bis(1-phenylethyl) phenols
ethoxylated or ethoxy/propoxylated tris(1-phenylethyl) phenols
ethoxylated or ethoxy/propoxylated alkylphenols The number of oxyethylene (OE) and/or oxypropylene (OP) units in these nonionic surfactants usually varies from 2 to 100 depending on the desired HLB (hydrophilic/lipophilic balance). More especially, the number of OE and/or OP units lies between 2 and 50. Preferably the number of OE and/or OP units is between 10 and 50.

The ethoxylated or ethoxy/propoxylated fatty alcohols generally comprise from 6 to 22 carbon atoms, the OE and OP units being excluded from these numbers. Preferably, these units are ethoxy units.

The ethoxylated or ethoxy/propoxylated triglycerides can be triglycerides of plant or animal origin (such as lard, tallow, groundnut oil, butter oil, cottonseed oil, linseed oil, olive oil, fish oil, palm oil, grape-pip oil, soya-bean oil, castor oil, rapeseed oil, copra oil, coconut oil), and are preferably ethoxylated.

The ethoxylated or ethoxy/propoxylated fatty acids are esters of fatty acids (such as, for example, oleic acid, stearic acid), and are preferably ethoxylated.

The ethoxylated or ethoxy/propoxylated sorbitan esters are cyclized sorbitol esters of a fatty acid comprising from 10 to 20 carbon atoms, such as lauric acid, stearic acid or oleic acid, and are preferably ethoxylated.

The term ethoxylated triglyceride applies, in the present invention, both to the products obtained by ethoxylation of a triglyceride with ethylene oxide and to those obtained by transesterification of a triglyceride with a polyethylene glycol.

Similarly, the term ethoxylated fatty acid includes both the products obtained by ethoxylation of a fatty acid with ethylene oxide and those obtained by transesterification of a fatty acid with a polyethylene glycol.

The ethoxylated or ethoxy/propoxylated fatty amines generally have from 10 to 22 carbon atoms, OE and OP units being excluded from these numbers, and are preferably ethoxylated.

The ethoxylated or ethoxy/propoxylated alkylphenols generally have 1 or 2 linear or branched alkyl groups having 4 to 12 carbon atoms. As an example, octyl, nonyl or dodecyl groups may be mentioned in particular.

As examples of nonionic surfactants of the ethoxylated or ethoxy/propoxylated alkylphenols, ethoxylated bis(1-phenylethyl)phenols and ethoxylated or ethoxy/propoxylated tris(1-phenylethyl)phenols group, there may be mentioned, in particular, ethoxylated bis(1-phenylethyl)phenol with 5 OE units, ethoxylated bis(1-phenylethyl)phenol with 10 OE units, ethoxylated tris(1-phenylethyl)phenol with 16 OE units, ethoxylated tris(1-phenylethyl)phenol with 20 OE units, ethoxylated tris(1-phenylethyl)phenol with 25 OE units, ethoxylated tris(1-phenylethyl)phenol with 40 OE units, ethoxy/propoxylated tris(1-phenylethyl)phenols with 25 OE+OP units, ethoxylated nonylphenol with 2 OE units, ethoxylated nonylphenol with 4 OE units, ethoxylated nonylphenol with 6 OE units, ethoxylated nonylphenol with 9 OE units, ethoxy/propoxylated nonylphenols with 25 OE+OP units, ethoxy/propoxylated nonylphenols with 30 OE+OP units, ethoxy/propoxylated nonylphenols with 40 OE+OP units, ethoxy/propoxylated nonylphenols with 55 OE+OP units and ethoxy/propoxylated nonylphenols with 80 OE+OP units.

The pulverulent compositions according to the invention comprise, in addition, at least one water-soluble compound chosen from polyelectrolytes belonging to the family of weak polyacids.

Weak polyacid means a polyacid presenting a pKa between 3 and 6.

More especially, this compound is a solid.

According to a particular embodiment of the invention, this water-soluble compound is chosen from polyelectrolytes of an organic nature, originating from the polymerization of monomers which have the following general formula:

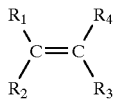

in which formula the radicals $R_i$, which may be identical or different, represent H, $CH_3$, $CO_2H$ or $(CH_2)_nCO_2H$ with n=0 to 4.

As non-limiting examples, acrylic, methacrylic, maleic, fumaric, itaconic and crotonic acids may be mentioned.

The copolymers obtained from the monomers corresponding to the above general formula and those obtained using these monomers and other monomers, especially vinyl derivatives such as vinyl alcohols and vinyl amides such as vinylpyrrolidone, are also suitable for the invention. There may also be mentioned the copolymers obtained from alkyl vinyl ether and maleic acid, as well as those obtained from vinylstyrene and maleic acid which are described, in particular, in the Kirk-Othmer encyclopedia entitled "ENCYCLOPEDIA OF CHEMICAL TECHNOLOGY"— Volume 18—3rd edition—Wiley insterscience publication—1982.

The peptide polymers derived from the polycondensation of amino acids, in particular of aspartic and glutamic acids, or from precursors of the diamino diacids, are also suitable for the invention. These polymers may be either homopolymers derived from aspartic or glutamic acid, or copolymers derived from aspartic acid and glutamic acid in any proportions, or copolymers derived from aspartic and/or glutamic acid and other amino acids. Among amino acids which can be copolymerized, glycine, alanine, leucine, isoleucine, phenylalanine, methionine, histidine, proline, lysine, serine, threonine, cysteine, etc., may be mentioned.

Preferred polyelectrolytes have a low degree of polymerization.

The weight average molecular mass of the polyelectrolytes is, more especially, less than 20,000 g/mole. Preferably it is between 1000 and 5000 g/mole.

Naturally, it is entirely possible to envisage the use of these different types of water-soluble compounds in combination.

The pulverulent compositions of the present invention can contain, in addition, an additional ionic surfactant.

The additional ionic surfactants can be, more especially, amphoteric surfactants, alkylbetaines, alkyldimethylbetaines, alkylamidopropylbetaines, alkylamidopropyldimethylbetaines, alkyltrimethylsulphobetaines, imidazoline derivatives such as alkylamphoacetates, alkylamphodiacetates, alkylamphopropionates, alkylamphodipropionates, alkylsultaines or alkylamidopropylhydroxysultaines, and the condensation products of fatty acids and protein hydrolysates, the amphoteric derivatives of alkylpolyamines such as Amphionic XL® marketed by Rhône-Poulenc and Ampholac 7T/X® and Ampholac 7C/X® marketed by Berol Nobel.

The compositions according to the invention can comprise, in addition, at least one additional anionic surfactant. Thus it is possible to use water-soluble salts of alkyl sulphates and of alkyl ether sulphates, alkylisethionates and alkyltaurides or their salts, alkyl carboxylates, alkyl sulphosuccinates or alkyl succinamates, alkylsarcosinates, the alkyl derivatives of protein hydrolysates, acylaspartates and alkyl and/or alkyl ether and/or alkyl aryl ether phosphate esters.

The cation is, in general, an alkali metal or alkaline-earth metal, such as sodium, potassium, lithium or magnesium, or an ammonium group $NR_{4+}$ with the radicals R, which may be identical or different, representing an alkyl radical substituted or otherwise with an oxygen or nitrogen atom.

It is possible to add any standard additive, depending on the field of application of the said compositions, to the pulverulent composition according to the invention.

In the pulverulent compositions according to the invention, the content of powder of film-forming polymer is advantageously between 40 and 90 parts by weight in the pulverulent composition. According to a particular embodiment of the invention, the content of powder of film-forming polymer is at least 70 parts, by weight.

The amount of nonionic surfactant varies, in general, between 0.2 and 30 parts by weight in the pulverulent composition. Preferably, this content is between 1 and 20 parts by weight, more preferably still between 2 and 10 parts.

The amount of water-soluble compound varies, in general, between 7 and 50 parts by weight in the pulverulent composition. According to a preferred variant, this amount is between 8 and 25 parts by weight.

The weight ratio of the concentrations between the nonionic surfactant and the water-soluble compound is, in general, between 30:70 and 10:90.

In the case where the pulverulent composition of the invention comprises at least one additional surfactant, the weight ratio of the concentrations between the nonionic surfactant and the additional surfactant(s) is, in general, between 5 and 10.

The composition according to the invention can comprise, in addition, at least one mineral filler having a particle size of less than 10 μm approximately, preferably less than 3 μm.

As mineral filler, it is recommended to use a filler chosen, in particular, from calcium carbonate, kaolin, barium sulphate, titanium oxide, talc, hydrated alumina, bentonite and calcium sulphoaluminate (satin white), and silica.

The presence of the mineral fillers favours the preparation of the powder and its stability on storage by preventing aggregation of the powder, that is to say caking thereof.

This mineral filler may be added directly to the pulverulent composition, or it may arise from the process for preparing the composition. The amount of mineral filler can be between 0.5 and 60, preferably from 10 to 20, parts by weight per 100 parts of powder of water-insoluble film-forming polymer.

The pulverulent compositions obtained are stable on storage; they may be readily redispersed in water in the form of a pseudolatex, and used directly in powder form or in the form of a pseudolatex in all known fields of application of latices.

The process for preparing the pulverulent composition will now be described.

As stated above, the process consists in:
  removing the water from an aqueous emulsion consisting of a water-insoluble film-forming polymer prepared by aqueous emulsion polymerization and containing at least one nonionic surfactant, at least one water-soluble compound and, where appropriate, at least one additional surfactant or one anti-caking agent, and in spraying the dry residue to a powder of desired particle size.

Naturally, in the case where standard additives are used, they may be added during the formation of the emulsion.

The process starts from an aqueous emulsion of the powder of water-insoluble film-forming polymer, obtained by emulsion polymerization as defined above. This type of emulsion is commonly referred to as a latex.

To this aqueous emulsion are added the other components of the pulverulent composition: nonionic surfactant, water-soluble compound, where appropriate the additional surfactant and/or the anti-caking agent. The respective contents of the various constituents are chosen such that the dry pulverulent compositions have the composition defined previously. Preferably, the process starts from an emulsion having a dry extract (film-forming polymer+nonionic surfactant+water-soluble compound+additional surfactant+anti-caking agent) of between 10 and 70% by weight, still more preferably between 40 and 60%.

The water of this emulsion is then removed and the product obtained sprayed in order to obtain a powder. The steps of removal of water from the latex emulsion and of obtaining a powder may be separate or concomitant. Thus, it is possible to use a process of freezing, followed by a step of sublimation, or of lyophilization, of drying or of drying by atomization (spray drying).

Drying by atomization is the preferred process, since it enables the powder having the desired particle size to be obtained directly without necessarily including the step of grinding. The particle size of the powder is generally less than 500 μm.

The drying by atomization may be performed in the customary manner in any known apparatus, such as, for example, an atomization tower combining spraying, effected by means of a nozzle or a centrifugal impeller, with a stream of hot gas.

The inflow temperature of the hot gas (generally air) at the head of the column is preferably between 100 and 115° C., and the outflow temperature is preferably between 55 and 65° C.

The mineral filler may be added to the aqueous emulsion of starting polymer. All or part of the mineral filler may also be introduced during the spraying step in the process of drying by atomization. Lastly, it is possible to add the mineral filler directly to the final pulverulent composition.

In the majority of cases, the pulverulent compositions according to the invention are completely redispersible in water at room temperature by simple agitation. Completely redispersible is understood to refer to a powder according to the invention which, after the addition of a suitable amount of water, enables a pseudolatex to be obtained whose particle size is substantially identical to the size of the latex particles present in the starting emulsion.

The invention also relates to the pseudolatex obtained by redispersion in water of a pulverulent composition as defined above.

Lastly, the invention relates to the use of the pulverulent compositions described above in the building industry as additives to mixtures of inorganic hydraulic binders for the production of protective and decorative coatings, adhesive mortars and adhesive cements intended for affixing tiles and floor coverings. They prove especially useful for the preparation of ready-to-use powdered products based on cement and also on plaster.

The pulverulent compositions of the invention, or the pseudolatices derived therefrom, are usable, in addition, in all the other fields of application of latices, more especially in the field of adhesives, of paper coating and of paints. The pulverulent compositions according to the invention can contain, in addition, standard additives, especially biocides, microbiostats, bacteriostatics and silicone and organic antifoams.

The examples which follow illustrate the invention without, however, limiting its scope.

EXAMPLES

Example 1

The following emulsion is prepared in a blender:

| Composition | % by weight |
|---|---|
| styrene/butadiene latex (*) | 80 |
| ethoxylated nonylphenol with 10 OE units (**) | 1.2 |
| polyacrylic acid (** (Mw = 2000) | 8.8 |
| water | 10 |

(*) The styrene/butadiene latex has a dry extract of 50% by weight. It is obtained by emulsion polymerization of a mixture of 58 weight % of styrene and 42 weight % of butadiene. The average particle size of the polymer particles measured using a Brookhaven® granulometer is 0.12 μm. Its surface is only slightly carboxylated: it has a surface charge equal to 30 microequivalents of —COOH functions/g of polymer.

(**) The ethoxylated nonylphenol is marketed by Rhône-Poulenc under the name Soprophor® BC10.

(***) The polyacrylic acid is marketed by the company Aldrich.

1 kg of this emulsion is atomized under the standard conditions of a NIRO® type atomization column (115° C. at entry and 60° C. at exit). The emulsion is coatomized in the presence of a dispersion of kaolin such that the amount of kaolin in the final product is 12% by weight. The final product takes the form of a pourable powder composed of more or less spherical particles having the following characteristics:

the size of the particles is between 10 and 100 μm, the dry extract of the powder is 99%, the weight composition of the dry powder is as follows:

styrene/butadiene latex 70% ethoxylated nonylphenol 2% polyacrylic acid 15% kaolin 12% water 1%

The atomized product redisperses spontaneously in water at room temperature. The average size of the particles of the emulsion obtained, measured using a Brookhaven® granulometer, is 0.13 μm.

Example 2

The following emulsion is prepared in a blender:

| Composition | % by weight |
|---|---|
| styrene/butadiene latex | 80 |
| ethoxylated nonylphenol with 30 OE units (*) | 1.2 |
| polyacrylic acid (Mw = 2000) | 8.8 |
| water | 10 |

(*) The ethoxylated nonylphenol is marketed by Rhône-Poulenc.

The other constituents are the same as in Example 1.

The mixture is atomized using a BUCHI® device with an entry temperature of 110° C. and an exit temperature of 70° C.

The powder obtained after atomization displays spontaneous dispersion in water. The pseudolatex obtained has a particle size identical to that of the starting latex.

Example 3

The following emulsion is prepared in a blender:

| Composition | % by weight |
| --- | --- |
| styrene/butadiene latex | 80 |
| ethoxylated nonylphenol with 10 OE units | 1.2 |
| polyacrylic acid (*) (Mw = 5000) | 17.6 |
| water | 1.2 |

(*) The polyacrylic acid is marketed by the company Aldrich and is in solution at a concentration of 50% by weight in water.

The other constituents are the same as in Example 1.

This mixture is atomized using a BUCHI® device with an entry temperature of 110° C. and an exit temperature of 70° C.

The powder obtained after atomization displays spontaneous dispersion in water. The pseudolatex obtained has a particle size identical to that of the starting latex.

Example 4

The following composition is prepared in a blender:

| Composition | % by weight |
| --- | --- |
| styrene/butadiene latex | 82 |
| ethoxylated nonylphenol with 10 OE units | 1.2 |
| polyitaconic acid (*) (Mw = 2000) | 8.8 |
| water | 10 |

(*) The polyitaconic acid is marketed by the company Rhône-Poulenc.

The other constituents are the same as in Example 1.

This mixture is atomized in the same way as in Example 1. A powder is obtained which redisperses spontaneously in water. The pseudolatex obtained has an average particle size equivalent to that of the starting latex.

What is claimed is:

1. A water-redispersible pulverulent composition, comprising:
    a powder of one or more water-insoluble film-forming polymers prepared from at least one ethylenically unsaturated monomer;
    at least one nonionic polyoxyalkylenated surfactant; and
    at least one water-soluble polyelectrolyte belonging to the family of weak polyacids originating from the polymerization of monomers having the following formula:

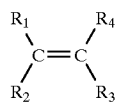

wherein $R_1$, $R_2$, $R_3$ and $R_4$, which may be identical or different, being H, $CH_3$, $CO_2H$ or $(CH_2)_n CO_2H$, with n=0 to 4. and with the proviso that at least one of the $R_1$, $R_2$, $R_3$ and $R_4$ groups bears a carboxylic acid group.

2. A pulverulent composition according to claim 1, wherein the water-insoluble film-forming polymers are vinyl homopolymers, acrylate homopolymers, styrene/butadiene copolymers, stryene/acrylate copolymers, or styrene/butadiene/acrylate copolymers.

3. A pulverulent composition according to claim 1, wherein the water-insoluble film-forming polymer has a level of surface acidity of not more than 100 microequivalents of —COOH functions per gram of polymer.

4. A pulverulent composition according to claim 1, wherein the nonionic surfactant is selected from the group consisting of: ethoxylated fatty alcohols, ethoxy/propoxylated fatty alcohols, ethoxylated triglycerides, ethoxy/propoxylated triglycerides, ethoxylated fatty acids, ethoxy/propoxylated fatty acids, ethoxylated sorbitan esters, ethoxy/propoxylated sorbitan esters, ethoxylated fatty amines, ethoxy/propoxylated fatty amines, ethoxylated bis(1-phenylethyl)phenols, ethoxy/propoxylated bis(1-phenylethyl)phenols, ethoxylated tris(1-phenylethyl)phenols, ethoxy/propoxylated tris(1-phenylethyl)phenols, ethoxylated alkylphenols, and ethoxy/propoxylated alkylphenols.

5. A pulverulent composition according to claim 1, wherein the polyelectrolytes have a weight average molecular mass of less than 20,000 g/mole.

6. A pulverulent composition according to claim 1, further comprising at least one additional ionic surfactant.

7. A pulverulent composition according to claim 1, wherein the content of powder of film-forming polymer is between 40 and 90 parts by weight in the pulverulent composition.

8. A pulverulent composition according to claim 7, wherein the amount of nonionic surfactant varies between 1 and 20 parts by weight in the pulverulent composition.

9. A pulverulent composition according to claim 8, wherein the amount of water-soluble compound is between 7 and 50 parts by weight in the pulverulent composition.

10. A pulverulent composition according to claim 6, wherein the weight ratio of the concentrations between the nonionic surfactant and the additional ionic surfactant is between 5 and 10.

11. A pulverulent composition according to claim 1, wherein the weight ratio of the concentrations between the nonionic surfactant and the water-soluble compound is between 30:70 and 10:90.

12. A pulverulent composition according to claim 1, further comprising a powdered mineral filler of particle size less than 10 μm.

13. A pulverulent composition according to claim 12, wherein the particle size is less than 3 μm.

14. A process for the preparation of a pulverulent composition comprising:
    a powder of at least one water-insoluble film-forming polymer prepared from at least one ethylenically unsaturated monomer;
    at least one nonionic surfactant selected from the group consisting of the polyoxyalkylenated derivatives; and
    at least one water-soluble polyelectrolyte belonging to the family of weak polyacids originating from the polymerization of monomers having the following formula:

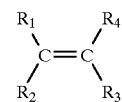

wherein $R_1$, $R_2$, $R_3$ and $R_4$, which may be identical or different, being H, $CH_3$, $CO_2H$ or $(CH_2)_n CO_2H$ with n=0 to 4, said process comprising the steps of:
    (a) removing the water from an aqueous emulsion of said water-insoluble film-forming polymer prepared by aqueous emulsion polymerization and containing at least said one nonionic surfactant, at least said one water-soluble compound and, optionally, at least one additional surfactant or one anti-caking agent; and (b) spraying the dry residue into a powder of desired particle size.

15. A process according to claim 14, wherein the aqueous emulsion has a dry extract of between 30 and 70% by weight.

16. A process according to claim 15, wherein step (a) and step (b) are concomitant.

17. A process according to claim 16, wherein step (a) and step (b) are concomitant to perform a process of drying by atomization.

18. A process according to claim 14, further comprising adding a mineral filler during the spraying step (b).

19. A pseudolatex comprising a pulverulent composition as defined in claim 1 redispersed in water.

20. A hydraulic binder comprising a pulverulent composition as defined in claim 1.

21. A hydraulic binder comprising a pseudolatex as defined in claim 19.

22. An adhesive comprising a pulverulent composition as defined in claim 1.

23. An adhesive comprising a pseudolatex as defined in claim 19.

24. A paper coating composition comprising a pulverulent composition as defined in claim 1.

25. A paper coating composition comprising a pseudolatex as defined in claim 19.

26. A paint comprising a pulverulent composition as defined in claim 1.

27. A paint comprising a pseudolatex as defined in claim 19.

* * * * *